Sept. 1, 1964  R. C. McDOWELL ETAL  3,146,901
APPARATUS FOR CHARGING SCRAP METAL TO A FURNACE
Filed Dec. 13, 1962  3 Sheets-Sheet 1

INVENTORS.
ROBERT C. McDOWELL
ROGER L. HULETTE
BY EDWARD E. CHEEK

ATTORNEY.

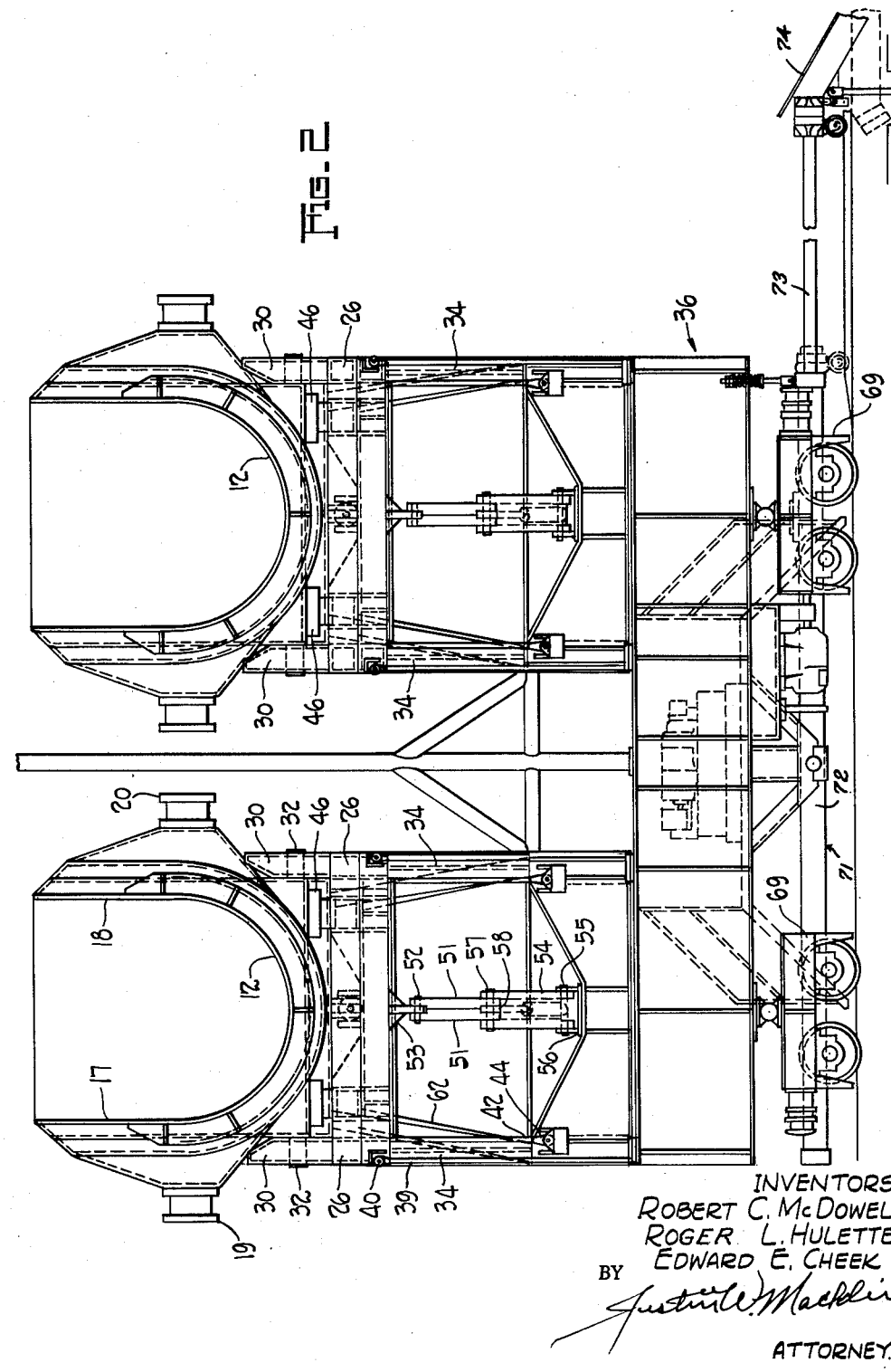

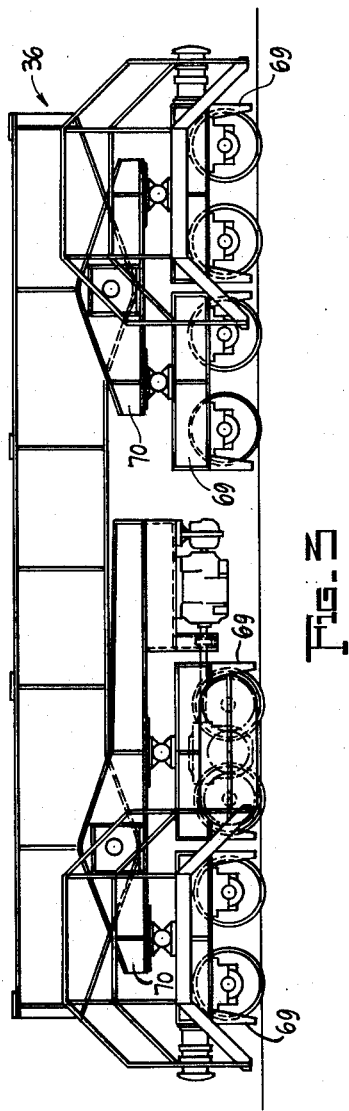

United States Patent Office 3,146,901
Patented Sept. 1, 1964

3,146,901
APPARATUS FOR CHARGING SCRAP METAL
TO A FURNACE
Robert C. McDowell, Cleveland, Roger L. Hulette, Berea, and Edward E. Cheek, Cleveland, Ohio, assignors to McDowell-Wellman Engineering Company
Filed Dec. 13, 1962, Ser. No. 244,472
4 Claims. (Cl. 214—18)

This invention relates, as indicated, to an improved apparatus particularly useful for orienting and delivering scrap metal, for example, scrap iron, from one container to a furnace, and more particularly adapted for use in orienting and delivering scrap metal to a chute or to a metal treating furnace, such as a basic oxygen furnace.

This invention has particular utility with respect to the direct charging of scrap metal to the narrow mouth opening of a basic oxygen furnace, or indirectly to such a furnace through an intermediate chute. The following description will be confined for illustrative purposes, however, to the direct introduction of scrap iron which is the particular and preferred utility of the apparatus.

The introduction of the basic oxygen process for the production of steel has brought economies in steel production. At the same time, problems have been introduced by the nature of the apparatus used and the conditions under which the process is performed. Introduction of this process has necessitated handling scrap with greater facility and speed in orienting and discharging the metal into the furnace. The furnace which is used in converting the charge to purified metal, that is for chemically removing impurities such as carbon, silicon, phosphorus, etc. is generally a narrow mouth refractory lined, steel jacketed vessel. The sidewalls of the furnace converge to provide a mouth or opening which is narrower than the maximum width of the receptacle. Desire to improve entry of scrap metal through such an opening in an efficient manner without damage to the lining has resulted in the design of special equipment for introducing a body of scrap iron into a basic oxygen furnace, and it is to the provision of an improved apparatus of this type that this invention is particularly directed.

Scrap metal as contemplated herein is most usually a heterogeneous mixture of miscellaneous scrap of irregular size and composition including mill scrap as well as scrap from junk yards. Components of a scrap charge may range in weight from a few grams to several tons.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

The invention will be better understood by having reference to the annexed drawings which illustrate a preferred embodiment of a scrap metal charging apparatus in accordance herewith and wherein:

FIG. 2 is a front elevation of a charging apparatus such as shown in FIG. 1 and showing two scrap metal charging carriers in side by side relation on a supporting frame.

FIG. 3 is a rear elevation in the plane indicated by the line 3—3 of FIG. 1 and showing an arrangement of trucks and equalizers for supporting the charging apparatus of this invention.

Figure 1:
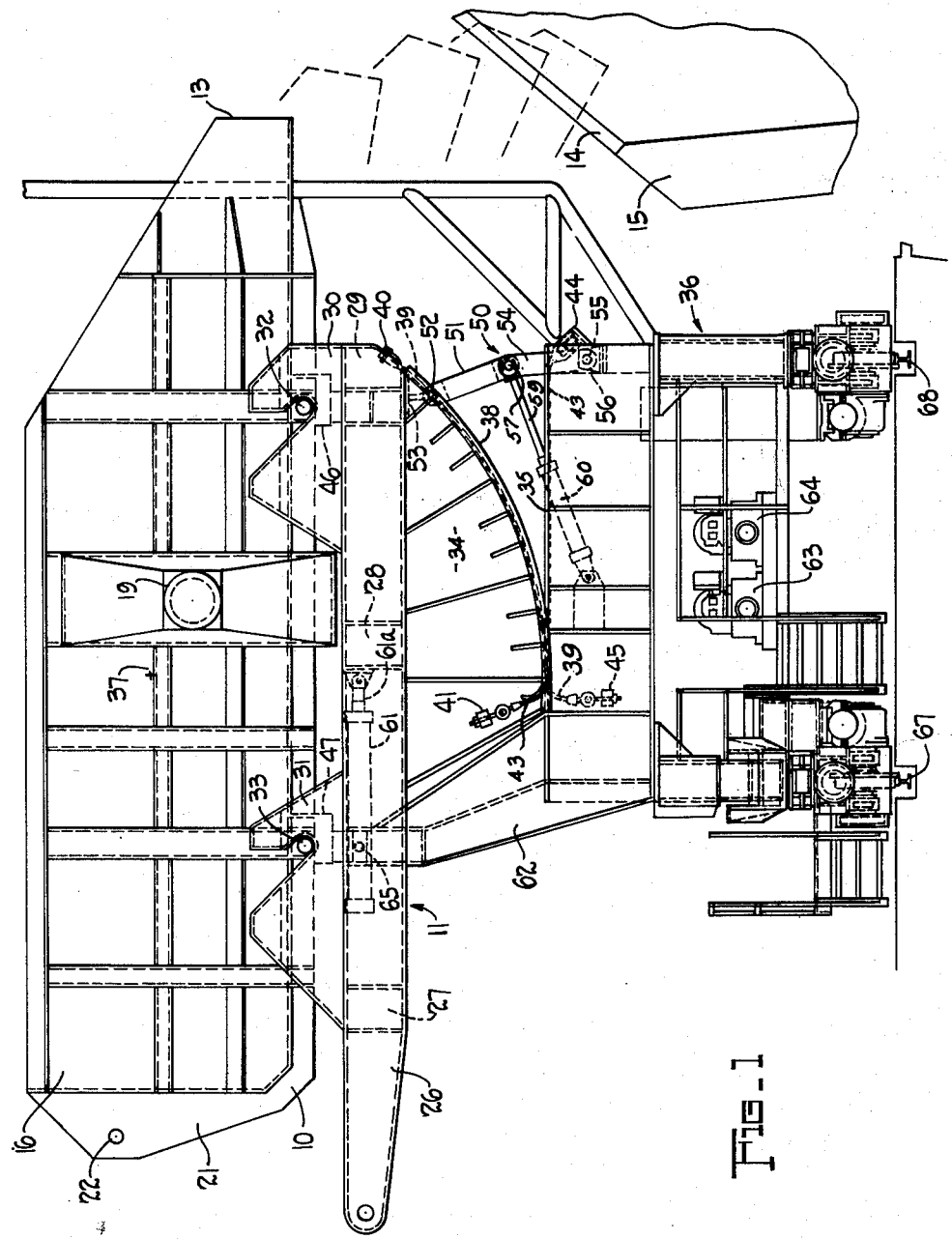
FIG. 1 is a side elevation of a scrap iron charging apparatus of this invention and showing the trajectory of the discharge end of a scrap metal carrying box or container in relation to the mouth of a basic oxygen furnace.

Briefly stated, the present invention is in the provision of an apparatus for receiving and discharging scrap metal which comprises in combination a rigid support which is adapted to be fixedly or movably positioned adjacent a receptacle, such as a basic oxygen furnace, or an intermediate chute leading to such a furnace. Thus, the support may be carried by wheeled trucks operating along tracks adjacent and preferably in elevated relation to one or more such furnaces. A material carrier box having confining walls open at the top and at one end is provided for receiving and discharging the scrap metal, and this in turn is supported by suitable means, such as a cradle or frame, which will permit the carrier or box to be operated in such a manner as to discharge the contents thereof into a vessel. Means are provided for tilting the carrier for dumping the contents into the receiving vessel. In a preferred embodiment, means are provided for simultaneously tilting the carrier while advancing the tilt axis toward the vessel to effect a discharge of the contents into the receiving vessel.

Referring now more particularly to the annexed drawings, there is here shown in a preferred form of a scrap metal charging apparatus wherein there is provided a material receiving box or container 10 which is adapted to carry scrap metal. When the apparatus is to be used for charging scrap iron to a basic oxygen furnace, for example, the box 10 may have a capacity up to 150 tons of scrap metal. Box or car 10 is preferably constructed so as to be realeasably supported by a carrier support frame generally indicated at 11. Accordingly, box 10 may be loaded with scrap metal at a point remote from the furnace area and transported to the furnace area for mounting on the carrier support frame 11, as hereinafter more particularly described.

As shown in FIG. 2 the box 10 desirably has a rounded bottom 12. This serves several functions; for example, it accommodates the discharge extremity or lip 13 more readily to the circular mouth 14 of the basic oxygen furnace 15. The curved bottom also imparts a shape to the charge at the moment of discharge which is more readily received within the furnace body 15 to the end that damage to the refractory lining of the furnace is minimized. Also, as scrap metal material moves from the closed end 16 toward the discharge lip 13, the tendency as it moves is for elongated scrap metal pieces to become somewhat oriented and thus less likely to cause jamming at the mouth 14. Box 10 is also desirably constructed so that the sidewalls 17 and 18 diverge slightly in proceeding from the rear portion 16 toward the lip 13 to minimize jamming of scrap metal within the box 10.

In order to facilitate transportation of the box independently of the support frame 11, laterally extending trunnions 19 and 20 are provided on the sides of box 10 at a point close to the center of gravity of the loaded box. Trunnions 19 and 20 may be engaged by ladle hooks, for example, suspended from a travelling crane for box transport. Vertical rib 21 is provided with an eye 22 for attachment of a stabilizing hook.

Tipping of the scrap box to effect a discharge of scrap metal contained therein is effected by causing the box or carrier support frame 11 to rock forward on suitable rockers along racks of a predetermined contour supported on a rigid support 36 which is adapted to be positioned adjacent the receiving receptacle, e.g., furnace 15.

The movable carrier support frame 11 is best shown in FIG. 2 and comprises a yoke formed from a pair of longitudinal side rails 26 held in spaced relation by cross beams 27, 28 and 29. Longitudinal rails 26 have secured to the upper marginal edges thereof forward hooks 30 and rear hooks 31 which are adapted to receive and retain forward laterally projecting pins 32 and rearward laterally projecting pins 33 secured to the bottom marginal edge of scrap box 10. Hook members 30 and 31 are so constructed that the box 10 may be positioned within the hooks and stably supported thereby when the box 10 is in a horizontal position as well as when it is tipped forward as shown by the dotted lines in FIG. 1. At the same time, box 10 may be easily withdrawn from hooks 30 and 31 and removed to another location for reloading with scrap metal.

Damage to hook engaging pins 32 and 33 is minimized by providing forward buffers 46 and rear buffers 47 to sustain the major portion of the weight of the box 10 in the horizontal position. Buffers 46 and 47 may be spring loaded, or hydraulic supports as may be expedient to protect hooks 30 and 371 from undue wear.

The lower marginal edges of side rails 26 are provided with rockers 34 which curve upwardly and forwardly, preferably along a circular or arcuate path, and which are adapted to roll along track ways 35 carried by the rigid support generally indicated at 36. Rocker 34 is conveniently and economically of arcuate contour, as a segment of a wheel, the center of rotation of which is located near the center of gravity of a uniformly loaded box 10. The approximate location of the center of rotation or "tilt axis" is indicated in FIG. 1 at 37. When the track 35 is a horizontally disposed straight member, as shown in FIG. 1, the center of rotation for tilt axis 37 advances toward the receptacle 15 when the box 10-carrier support frame 11 combination is rotated about the axis 37.

Rocker 34 is conveniently provided with a channel-form rim 38. In order to prevent relative motion between rocker member 34 and track way 35, tensioned cables 39 and 43 are provided. Cable 39 is tensioned between adjustable frame anchor 40 secured to the forward end of longitudinal side rail 24 and the adjustable rear anchor 45 secured to the rigid frame generally indicated at 36 and intermediately following the contour of rim 38 and track surface 42. Cable 43 serves as a reaction member for cable 39 and is tensioned between adjustable rear rocker member anchor 41 and front support adjustable frame anchor 44. The oppositely directed effects of cables 39 and 43 serve to stabilize the rocker 34 on track 35 and to resist sliding of one member with respect to the other, or "kick back" as is otherwise likely when the load is discharged from box 10. Suitable cable receiving grooves are provided in the rim 38 and track 35 to prevent damage to the cables 39 and 43. There is also desirably provided a hardened surface or runner 42 of track way 35. Rocker 34 might equally satisfactorily have been provided with gear teeth, and track 35 provided with teeth in the form of a rack surface 42 in order to prevent slippage of one with respect to the other, the structure which is illustrated in the annexed drawings and described above accomplishes the same result in a much more economical fashion.

Any suitable driving means may be employed to effect a tilting of box 10. However, there has been shown in FIGS. 1 and 2 the preferred hydraulic means for effecting discharge of the contents and for returning the box to a substantially horizontal position. To secure the box in a horizontal position, there may be provided a toggle generally indicated at 50 including a link 51 secured by means of a pivot 52 in bracket 53 which is in turn rigidly affixed and secured to cross beam 29. In like manner, link 54 is secured by means of pivot 55 in bracket 56 which is in turn secured to rigid frame 36. Links 51 and 54 are joined together at their outer extremities by means of pin 57 which also rotatably secures on the same axis bracket 58 affixed to the distal extremity of hydraulic piston rod 59 and operated by reversible hydraulic cylinder 60.

Dumping and righting reversible hydraulic cylinder 61 and its piston 61a coacts between cross beam 28 carried by the movable frame 11, and the upper extremity of cylinder supporting pedestal 62 which is in turn secured to rigid frame 36. The hydraulic cylinder 61 is pivoted by means of pivot 65 on pedestal 62 for rotation thereabout.

Hydraulic pump units 63 and 64 carried on the rigid frame 36 coact respectively with cylinders 60 and 61 through suitable controls responsive to limit switches and manual positioning for effecting discharge of the contents of box 10 and return of the movable frame 11 carrying box 10 to its normal substantially horizontal position as shown in FIG. 1. Operation of pumps 63 and 64 in conjunction with hydraulic cylinders 60 and 61 and response to such controls as above indicated is conventional and forms no part of the present invention. Mechanical driving means other than hydraulic means may be used for effecting the operation of the apparatus.

As indicated above, hydraulic cylinder 60 coacts between the rigid support frame 36 and toggle 50, and with the application of a relatively minor amount of power, the piston rod 59 may be withdrawn into hydraulic cylinder 60 by removing the locking support member (toggle 50) which maintains movable frame 11 locked in a substantially horizontal condition, and thereby permitting the combination of box 10 and movable frame 11 to rock forward and tip downwardly in response to the action of rocker 34 on track 35 for discharge of the contents into furnace 15. Because the axis of rotation of arcuate rocker member 34 is intentionally disposed near the center of gravity of loaded box 10, very little power is required to be applied to cylinders 60 and 61 to effect the tilting and re-righting of the apparatus. As shown in FIG. 1, toggle 50 coacts with hydraulic cylinder 60 and piston rod 59 in such a manner as to overide a center, thereby locking the apparatus in the horizontal position. When the contents of box 10 have been discharged, a new center of gravity of the combination of box 10 and frame 11 is such that there is a tendency for the combination to spontaneously return to the horizontal position.

The precise construction of rigid frame 36 is relatively unimportant to the present invention, other than the requirement that it be sufficient to support the loads and structures above described. The apparatus shown in FIGS. 1–3 is adapted to be moved along rails 67 and 68, and such an apparatus is conveniently supported on trucks operating through a series of load equalizers 70.

As shown in FIG. 2 hydraulic indexing means may be provided in the form of hydraulic ram 71 of the double acting type and including hydraulic cylinder 72 and piston rod 73 having its free end adapted to coact with a retractable bumper assembly 74 forming an abutment in relation to which the charging apparatus may be indexed for discharge into a given furnace or receptacle.

As shown in FIG. 2, two scrap metal charging box assemblies are provided for feeding scrap into a pair of side-by-side basic oxygen furnace receptacles. It is to be understood that the principles of the present invention are applicable to charging apparatus including a single scrap metal box, or a plurality of boxes of the type shown in FIGS. 1 and 2.

An apparatus constructed in accordance with the principles above described provides for horizontal movement of the box as it tips thereby permitting the nose of the box to enter the mouth of the furnace and yield a better trajectory of the scrap material for entering deeper into the furnace. It is desirable to have the scrap fall as far into the vessel as possible, but with minimum velocity to avoid damage to the furnace refractory lining. An incidental advantage of the improved scrap trajectory provided by the apparatus of this invention is that the furnace 15 need not be rocked as frequently to seat the scrap charge in the bottom of the furnace as is required on currently available apparatus for charging of scrap material.

With respect to the center of rotation of the arcuate rocker 34, if this center is placed at the center of gravity of the load box mass, there is no lifting of the weight when tilting the box and less power is required to dump than is required by competitive devices. It has been found preferably, however, to locate the center of rotation slightly behind the center of gravity so that when the apparatus is tilted forward, there is always an overhauling torque requiring power to hold back rather than lift the load.

It should be pointed out that while the scrap charging apparatus of the present invention is shown with the scrap metal carrier box 10 perpendicular to the track for direct charging of scrap material into the furnace, the apparatus may be positioned with the box parallel to the trackway for discharge into a chute which in turn feeds the furnace.

Other modes of applying the principle of this invention may be employed instead of this specifically set forth above, changes being made as regards the details herein disclosed, provided the elements set forth in any of the following claims, or the equivalent of such be employed.

It is, therefore, particularly pointed out and distinctly claimed as the invention:

1. In an apparatus for receiving, transporting and discharging scrap metal into a metal treating vessel having a rigid support adapted to be positioned adjacent to said vessel and including a trackway extending toward said vessel, a scrap metal carrier having confining walls open at the top and at one end to receive and to discharge scrap metal, respectively; a rockable carrier support frame having a pair of upwardly and forwardly arcuately curving rocker members secured to opposed parallel lower marginal edges thereof for coaction with said trackway; the improvement which comprises said rocker members having circular peripheries, and having their centers on a common axis extending through the center of gravity of the combined load scrap metal carrier and said rockable carrier support frame, and tilt control means for regulating the tilting of the combined scrap metal carrier and rockable carrier support while the tilt axis advances towards the vessel to progressively discharge the scrap metal contents into said vessel and including a toggle having a pair of toggle links pivotally joined together to form a knee joint, one of said links being pivotally secured to the forward end of said carrier support frame, and the other toggle link being pivotally secured to said rigid support, and variable length linkage means coacting between said toggle knee and said rigid frame at a point rearward of the point where said toggle length is secured to said rigid frame, said toggle being adapted to over-ride center and lock said carrier support frame in a substantially horizontal position and to coact with said variable length linkage means to unlock said carrier support frame and permit it to rock forward to discharge the contents of said carrier, and means for varying the length of said linkage.

2. An apparatus in accordance with claim 1 including restraining means coacting with said rocker members and said trackway to prevent reactive sliding between the rockers and the trackway as said rockers roll along said trackway to discharge the contents of the scrap metal carrier into said vessel.

3. An apparatus in accordance with claim 2 in which the restraining means includes a pair of oppositely reacting tensioned cables coacting respectively between the rockable carrier support frame and the rigid support, and disposed between the peripheries of said rocker members and the trackway.

4. In an apparatus for receiving, transporting and discharging scrap metal into a metal treating vessel having a rigid support mounted on wheeled trucks and adapted to be positioned adjacent a metal treating vessel; a trackway mounted on said support including a pair of parallel runners extending towards said vessel; a scrap metal carrier having confining side walls open at the top and at one end to receive and to discharge scrap metal, respectively, said side walls diverging from the closed end of the carrier towards the open end thereof, and said carrier having a semi-circular bottom; a pair of forward pins laterally extending from the lower portion of said carrier; a pair of rearward pins laterally extending from the lower portion of said carrier; a rockable carrier support frame having a pair of upwardly and forwardly arcuately curving rocker members secured to opposed parallel lower longitudinal marginal edges thereof for coaction with said runners, respectively, the improvement which comprises, said runners having circular peripheries and having their centers on a common axis perpendicular to the rocker members and passing through the center of gravity of the combined loaded scrap metal carrier and said rockable carrier support frame; a pair of forward hooks on the upper longitudinal marginal edges of said carrier support frame adapted to coact with said forward laterally extending pins for releasably receiving and supporting said carrier in position for discharge of the contents thereof into said vessel; a pair of rearward hooks on the upper longitudinal marginal edges of said carrier support frame adapted to coact with said rearward laterally extending pins for releasably receiving and supporting said carrier in a position for discharge of the contents thereof into said vessel; a pair of oppositely reacting tensioned cables coacting respectively between the rockable carrier support frame and the rigid support and disposed between each rocker member and its corresponding runner to prevent reactive sliding between the rocker member and the corresponding runner as the carrier support frame rolls along said trackway to discharge the contents of said carrier into said vessel; tilt control means for regulating the tilting of the combined rockable carrier support and scrap metal carrier while the tilt axis advances towards the vessel to progressively discharge the scrap metal contents thereof into said vessel and including a toggle having a pair of toggle links pivotally joined together to form a knee joint, one of said links being pivotally secured to the forward end of said carrier support frame, and the other toggle link being pivotally secured to said rigid support; a hydraulically operated extensible and retractable linkage coacting between said toggle knee and said rigid frame at a point rearward of the point where said toggle link is secured to said frame, said toggle being adapted to over-ride center and lock said carrier supporting frame in a substantially horizonal position and to coact with said hydraulically extensible and retractable linkage to unlock said carrier support frame and permit it to rock forward to discharge the contents of said carrier.

References Cited in the file of this patent

UNITED STATES PATENTS

| | | |
|---|---|---|
| 443,574 | Hartman | Dec. 30, 1890 |
| 1,182,643 | Clark | May 9, 1916 |
| 3,069,030 | Schellentrager | Dec. 18, 1962 |